United States Patent
Goodno (10) Patent No.: US 11,409,032 B2
(45) Date of Patent: Aug. 9, 2022

(54) FIBER AMPLIFIER SYSTEM RESISTANCE TO NONLINEAR SPECTRAL BROADENING AND DECOHERENCE

(71) Applicant: NORTHROP GRUMMAN SYSTEMS CORPORATION, Falls Church, VA (US)

(72) Inventor: Gregory D. Goodno, Los Angeles, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 400 days.

(21) Appl. No.: 16/560,078

(22) Filed: Sep. 4, 2019

(65) Prior Publication Data

US 2021/0063635 A1 Mar. 4, 2021

(51) Int. Cl.
G02B 6/036 (2006.01)
H01S 3/067 (2006.01)
H01S 3/23 (2006.01)
G02B 6/02 (2006.01)

(52) U.S. Cl.
CPC ..... *G02B 6/03694* (2013.01); *G02B 6/02009* (2013.01); *H01S 3/06708* (2013.01); *H01S 3/06754* (2013.01); *H01S 3/2383* (2013.01); *H01S 3/2391* (2013.01)

(58) Field of Classification Search
None
See application file for complete search history.

(56) References Cited

U.S. PATENT DOCUMENTS

| | | | |
|---|---|---|---|
| 9,036,252 B1 | 5/2015 | Goodno et al. | |
| 9,106,051 B1 | 8/2015 | Goodno et al. | |
| 2011/0032605 A1* | 2/2011 | Kliner | H01S 3/11 359/344 |
| 2014/0086267 A1* | 3/2014 | Dennis | H01S 3/06754 372/6 |
| 2018/0269645 A1* | 9/2018 | Cannon | H01S 3/10015 |
| 2019/0190225 A1 | 6/2019 | Goodno | |
| 2019/0305504 A1 | 10/2019 | Goodno et al. | |

(Continued)

OTHER PUBLICATIONS

N. M. Luzod, "Stimulated Brillouin Scattering: Mitigation Techniques and Applications", Masters Report, p. 18 (Year: 2016).*

(Continued)

*Primary Examiner* — Eric L Bolda
(74) *Attorney, Agent, or Firm* — John A. Miller; Shumaker, Loop & Kendrick, LLP (57) ABSTRACT

A method for reducing nonlinear frequency shifts and suppressing stimulated Brillouin scattering (SBS) in a fiber laser amplifier system. The method includes providing a seed beam having a certain wavelength and frequency modulating the seed beam with an RF waveform to spectrally broadening the seed beam, where the RF waveform is a relatively slow-speed waveform having a large modulation depth. The method also includes amplifying the frequency modulated seed beam with an amplifier having a large nonlinear phase shift and exhibiting frequency modulation (FM) to amplitude modulation (AM) conversion, where the modulation depth is much larger than the nonlinear phase shift of the amplifier.

20 Claims, 3 Drawing Sheets

(56) References Cited

U.S. PATENT DOCUMENTS

2019/0305505 A1    10/2019    Goodno et al.

OTHER PUBLICATIONS

Wirth et al. "High Average Power Spectral Beam Combining of Yb-doped Fiber Amplifiers", OSA Technical Digest Series (CD) (Optical Society of America, 2009), paper TuB14. (Year: 2009).*
Jeffrey O. White, Joshua T. Young, Chengli Wei, Jonathan Hu, and Curtis R. Menyuk. "Seeding fiber amplifiers with piecewise parabolic phase modulation for high SBS thresholds and compact spectra"; Optics Express; vol. 27. No. 3; Feb. 4, 2019; pp. 2962-2974; https://doi.org/10.1364/OE.27.002962.

* cited by examiner

FIBER AMPLIFIER SYSTEM RESISTANCE TO NONLINEAR SPECTRAL BROADENING AND DECOHERENCE

BACKGROUND

Field

This disclosure relates generally to a method for reducing nonlinear frequency shifts driven by frequency modulation (FM) to amplitude modulation (AM) conversion in a fiber laser amplifier system and, more particularly, to a method for reducing nonlinear frequency shifts driven by FM-to-AM conversion and suppressing stimulated Brillouin scattering (SBS) in a fiber laser amplifier system, where the method uses low-speed, large modulation depth RF waveforms to modulate a seed beam to broaden the beam linewidth.

Discussion

High power laser amplifiers have many applications including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam that amplifies the seed beam and generates the high power laser beam, where the fiber has an active core diameter of about 10-20 μm or larger. Fiber laser amplifiers are useful as energy sources for directed energy weapons because of their high efficiency, high power scalability and excellent beam quality.

Improvements in fiber laser amplifier designs have increased the output power of the fiber to approach its practical power and beam quality limit. To further increase the output power of a fiber amplifier some fiber laser systems employ multiple fiber laser amplifiers that combine the amplified beams in some fashion to generate higher laser beam powers. A design challenge for fiber laser amplifier systems of this type is to combine the beams from a plurality of fiber amplifiers in a manner so that the beams provide a single combined beam output such that the beam can be focused to a small focal spot. Focusing the combined beam to a small spot at a long distance (far-field) defines the quality of the beam.

In one known multiple fiber amplifier design called coherent beam combining (CBC), a master oscillator (MO) generates a seed beam that is split into a plurality of split seed beams each having a common wavelength, where each seed beam is amplified. The amplified seed beams are then directed to a diffractive optical element (DOE), or other optical system, that combines the coherent amplified beams into a single output beam. The DOE has a periodic structure formed into the element so that when the individual amplified beams each having a slightly different angular direction are redirected by the periodic structure all of the beams diffract from the DOE in the same direction. For each seed beam, an error signal derived from a sample of the amplified output beam is provided to a phase modulator that controls the phase of the beam so that the phase of all the seed beams is maintained coherent. The primary requirement for CBC fiber amplifier systems is high beam coherence, which equates to narrow spectral linewidth of the beam. For CBC laser systems using spectrally broad ytterbium (Yb) doped fiber amplifiers, the fiber path-length (time-of-flight) must be precisely matched to be within a small fraction of the laser coherence length, which is technically challenging with broad linewidths. Thus, limitations on phase control bandwidth and wavefront errors limit the number of amplified beams that can be coherently combined, which limits the output power of the fiber laser amplifier system.

In another known multiple fiber amplifier design called spectral beam combining (SBC), a plurality of master oscillators (MOs) generate a plurality of seed beams at a plurality of different wavelengths, where each seed beam is amplified. The amplified seed beams are then directed to a diffraction grating, or other wavelength-selective element, that combines the different wavelength fiber beams into a single combined output beam. The diffraction grating has a periodic structure formed into the grating so that when the individual amplified beams each having a slightly different wavelength and angular direction are redirected by the periodic structure all of the beams diffract from the diffraction grating in the same direction. The primary requirement for SBC systems is narrow spectral linewidth. For CBC laser systems using spectrally broad Yb doped fiber amplifiers, the beam quality of the combined output beam can be degraded by angular dispersion from the diffraction grating. Keeping the fiber amplifiers with narrow linewidths allows more wavelength channels to be packed into the amplifier tuning range to enable scaling to higher powers. However, limitations on spectral brightness limit the number of fiber beams that can be wavelength-combined, thus limiting the output power of the fiber laser amplifier system.

To overcome these limitations and further increase the laser beam power, multiple master oscillators can be provided to generate seed beams at different wavelengths, where each of the individual wavelength seed beams is split into a number of seed beams and where each group of seed beams has the same wavelength and are mutually coherent, thus providing a CBC and SBC hybrid fiber laser amplifier system. Each group of the coherent seed beams at a respective wavelength are first coherently combined by a DOE or other optical system that causes the group of beams to co-propagate as a group of coherently combined beams, and then each group of coherently combined beams are directed to an SBC diffraction grating at slightly different angles that diffracts the beams in the same direction as a single combined beam of multiple wavelengths. The SBC diffraction grating also includes a periodic structure for combining the beams at the different wavelengths.

Power-scaling of narrow-linewidth Yb doped fiber amplifiers is currently limited by two separate nonlinear optical impairments, specifically stimulated Brillouin scattering (SBS) and self-phase modulation (SPM), where the primary nonlinear impairment is SBS. SBS is a nonlinear effect in which the laser electric field creates a phase grating in the fiber core by electrostriction that reflects some fraction of the forward-propagating beam. If the effective reflectivity of the grating becomes too large, the output power from the fiber amplifier will decrease, with the lost power being reflected backwards towards upstream, low-power components, eventually causing catastrophic damage. Because the threshold for SBS is proportional to the spectral brightness (power/linewidth), SBS limits the powers available from single-frequency fiber lasers to several hundred watts. To increase the threshold power for SBS, it is common practice to broaden the fiber laser input seed spectrum to the multi-GHz domain using phase modulation, or equivalently frequency modulation (FM). This reduces the optical coherence length and therefore reduces SBS gain. As the power of Yb doped fiber amplifiers increases to the multi-kW level, or as delivery fiber lengths increase, broader FM linewidths are needed to suppress SBS. Typically the linewidth increases approximately linearly with power on the order of ~10-20 GHz/kW for Yb doped fiber amplifiers. Reducing the SBS-limited linewidth, i.e., increasing the SBS-limited fiber spectral brightness, would enable beam-combined fiber laser system scaling to higher powers.

The master oscillator seed beam source for a laser chain is typically a single-frequency laser source. The optical linewidth of the seed beam source is typically broadened to suppress SBS in a subsequent high power fiber amplifier chain by imposing FM on the seed beam using an electro-optic phase modulator (EOM) that is driven by an RF waveform. The broadened optical linewidth is typically proportional to the FM modulation depth, which in turn is proportional to the voltage amplitude of the applied RF waveform. It is noted that the terminology "large modulation depth RF waveform" as used herein refers to an RF waveform with a high enough voltage that when it is used to drive an EOM, leads to a high modulation depth phase shift.

There is a large body of public domain literature investigating the effect of different RF waveforms used to drive EOMs to apply FM to broaden the laser seed beam linewidth to suppress SBS. Generally, the goal of the known art is to raise the SBS threshold as high as possible for a given optical spectral linewidth. Two common RF waveforms used to drive EOMs to apply FM for SBS suppression are white noise and pseudo-random bit sequences (PRBS). Another technique applies a piecewise parabolic RF waveform to an EOM to synthesize a seed beam source whose optical frequency is repetitively chirped up and down in time. This technique predicts that a repetitively chirped seed beam source can provide ~1.9× better SBS suppression than a noise modulated seed, and ~1.2×better than PRBS. The chirped seed beam has improved SBS performance because of its flat, wing-free spectrum and because of the ability to adjustably tailor chirp rates and chirp periods to optimally match the effective SBS interaction length in the fiber. The compact chirped spectra are better suited for dense SBC than the PRBS or noise spectra, whose broad spectral wings degrade combined beam quality owing to angular dispersion from the combining grating.

The optical impairment SPM is parameterized by the B-integral, i.e., the non-linear phase shift, and can degrade beam coherence by converting low levels of uncontrolled AM into phase noise. This non-linear effect can limit the efficiency of CBC or the beam quality of SBC, hence reducing the performance of the fiber laser system. Specifically, there is a loss of spectral brightness or a loss of optical coherence. To avoid or reduce these effects, it is generally desirable to limit the amount of AM, also known as relative intensity noise (RIN), propagating in the seed beam that seeds the fiber amplifier. Techniques that broaden the spectrum of the seed beam to provide frequency modulation without providing amplitude modulation can be implemented in a fiber amplifier, where if the seed beam is only frequency modulated, then the Kerr non-linearities that drive SPM will not create problems, i.e., no time dependent non-linear phase shifts of the seed beam. However, if AM is imposed, either deliberately or inadvertently by FM-to-AM conversion, on the seed beam, then SPM can cause nonlinear spectral broadening of the beam emitted from the fiber amplifier, which could reduce beam quality during SBC.

Generally, to maintain the degradation of the beam quality defined by the Strehl ratio to be below 1 in a coherently beam combined fiber laser system, it is desirable to maintain non-linear SPM phase fluctuations B*RIN<0.1 radians. For a typical 1.5-2 kW fiber amplifier with a B-integral of 10 radians, this implies a requirement to maintain RIN<1%. In order to avoid nonlinear beam quality degradation from SPM in an SBC fiber laser system, it is necessary to constrain any nonlinear frequency shifts to a small fraction of the original FM seed beam linewidth. Therefore, it is industry standard practice to employ FM seed beam sources having little or no AM, i.e., with constant power versus time. However, a number of effects have been observed that still partially convert FM into uncontrolled AM, where it can cause non-linear degradation through SPM. These effects include polarization mixing, chromatic dispersion, spectral filtering, or generally, any multi-path interference (MPI) effects. A typical signature of an MPI effect in a fiber component or fiber-based system is a spectrally dependent transmission that exhibits a periodic modulation pattern.

Multi-path interference effects in the fiber amplifier system components have been observed to partially convert FM into uncontrolled AM (FM-to-AM conversion) where it can cause nonlinear degradation via SPM. A multitude of diverse physical effects are responsible for FM-to-AM conversion, including dispersion, etaloning between component surfaces or splices, polarization-mixing and spatial mode-mixing. The effect of FM-to-AM conversion can be inferred from the measured spectral transmission of the fiber amplifier. If the measured spectral transmission is strongly frequency-dependent, then as the instantaneous frequency of the laser changes in time due to the FM imposed on the seed beam, the fiber amplifier transmission also changes, leading to time-dependent power changes (AM). Since FM-to-AM conversion is an interferometric phenomenon, it is difficult to eliminate at the component level. As the SBS-limited FM seed beam linewidth increases with power (typically ~10-20 GHz/kW), the AM becomes larger. Since SPM scales as the product of AM and the fiber B-integral, which also increases with power (typically ~5 rad/kW for commercial fiber amps), SPM-driven spectral broadening can grow quickly with power to become the dominant mechanism limiting combinability for multi-kW fibers.

It is known in the art that for FM linewidths that are significantly smaller than the free spectral range (FSR) of the spectral modulation, the magnitude of the FM-to-AM conversion can vary significantly depending on the relative wavelengths of the seed beam and the spectral transmission peak. The FM-to-AM conversion in the fiber will be minimized when the beam wavelength is aligned with a peak or null of the transmission spectrum, and will be maximized when the beam wavelength is between a peak and a null. This is because the instantaneous frequency of the FM signal is changing in time, and thus its transmission amplitude will also change in time leading to time-varying output power, i.e., AM. The magnitude of FM-to-AM conversion will be minimized when the spectral transmission over the beam bandwidth is as uniform as possible, which occurs near a transmission peak or null.

Various techniques have been introduced in the art to reduce SPM. One such technique involves applying spectral shaping of the input seed light to compensate for non-uniform spectral transmission of the Yb doped fiber amplifier. A spectral shaper is inserted in the low power seed beam fiber to apply the inverse of the spectral transmission imposed by the fiber amplifier. It was shown that this eliminates AM and the resulting SPM-driven spectral broadening. The drawback is that it adds complexity and hardware due to the need to add a spectral detector, actuator and an active control system. Another technique involves controlling the input seed beam polarization to partially compensate for FM-to-AM conversion in the Yb doped fiber amplifier. This works for cases when the FM-to-AM conversion process is driven by polarization mixing effects. However, it becomes less effective for other origins of FM-to-AM conversion, and it also adds complexity in requiring added detectors, actuators and controllers. Despite these efforts, there is a need for a technique to mitigate SPM-driven nonlinear spectral broadening that does not require added detectors, actuators or control systems.

A depolarized seed source can be desirable for SBC-based laser weapons systems, since it provides additional SBS suppression in comparison to a polarized seed, thus enabling narrower seed beam linewidths. Compared to polarized seed sources, depolarized seed beams are especially susceptible to FM-to-AM conversion since any component in the fiber amplifier chain that acts as a partial polarizer, and whose axes are not aligned with those of the depolarizer, can cause mixing of previously orthogonal polarization states, leading to large AM.

DETAILED DESCRIPTION OF THE EMBODIMENTS

The following discussion of the embodiments of the disclosure directed to a fiber laser amplifier system that employs various methods for reducing nonlinear frequency shifts and suppressing stimulated Brillouin scattering (SBS) using slow-speed, large modulation depth RF waveforms that modulate a seed beam for providing increased beam linewidth is merely exemplary in nature, and is in no way intended to limit the disclosure or its applications or uses.

As will be discussed in detail below, this disclosure describes various architectures and techniques for reducing the impact of nonlinear impairments in multi-kW fiber laser amplifiers used for spectrally and coherently beam combined, for example, laser weapons systems. The architectures include replacing high-speed (high frequency) electrical RF waveforms that are used in the known systems to broaden laser beam linewidths with low-speed (low frequency) large modulation depth RF waveforms. For the known high-speed electrical RF waveforms, it was typically desirable to set the frequency of the RF waveform relatively high based on the amount of optical linewidth needed to suppress SBS because the closer the frequency content of the electrical waveform is to the desired optical linewidth the less the electrical waveform needs to be amplified to provide that linewidth. Therefore, it is generally more straightforward and technically simpler to generate high frequency low amplitude, i.e., low voltage, electrical waveforms to obtain the desired optical linewidth. Calculations have shown that low frequency, i.e., slow-speed, RF waveforms provide resistance to nonlinear spectral broadening that currently limits laser scaling. The AM dynamics resulting from FM-to-AM conversion tends to follow the dynamics of the RF electrical waveform. Hence, the nonlinear frequency shifts due to SPM, which is driven by the AM dynamics, also tend to follow the dynamics of the RF electrical waveform. Thus, for a given optical linewidth, a high-speed RF waveform provides nonlinear spectral broadening that adds multiples of the RF waveform to the output linewidth, which is significant compared to the original linewidth. For a slow-speed, but high voltage, i.e., high modulation depth, RF waveform that gives the same optical linewidth, the nonlinear spectral broadening is a multiple of the lower frequency, which will be negligible compared to the original optical linewidth. Thus, for the high-speed RF waveform, the optical linewidth broadens more than the desired linewidth, and for the slow-speed RF waveform, the optical linewidth does not significantly change.

As discussed above, the inventive concept to mitigate SPM-driven spectral broadening is to replace the known high-speed, low modulation-depth RF waveforms used for FM linewidth broadening with a low-speed, high modulation-depth RF waveform. The AM that arises due to uncontrolled FM-to-AM conversion in the fiber amplifier will generally follow the dynamics of the applied RF. Hence, the nonlinear frequencies created by SPM will be small, and spectral broadening will be minimized.

This concept can be roughly parameterized to yield a crude approximation of the benefits. It is assumed that the fiber laser amplifier system has a single frequency RF modulation source and a spectral transmission function that is slowly varying over the laser beam optical linewidth. Variables referred to below include $f_{mod}$ as the RF modulation frequency (Hz), $\beta$ as the FM modulation depth (radians), B as the nonlinear SPM phase shift imposed by the fiber amplifier (radians), $\Delta v$ as the laser optical linewidth (Hz), and $\delta v_{SPM}$ as the nonlinear frequency shift due to SPM (Hz).

The optical linewidth, neglecting constant pre-factors, is approximately:

$$\Delta v = \beta f_{mod}.$$

With a slowly varying (large free spectral range) spectral transmission function, the AM frequencies created from FM-to-AM conversion will be on a similar order as the applied RF modulation frequency $f_{mod}$. For a worst case scenario (100% AM), the maximum nonlinear frequency shift due to SPM is:

$$\delta v_{SPM} = B f_{mod}.$$

Hence, an upper bound estimate is that the input spectrum will be nonlinearly broadened by the fraction:

$$\delta v_{SPM}/\Delta v = B/\beta.$$

This means that for $\beta \gg B$, nonlinear spectral broadening should be small, which suggests that for a given SBS-limited optical linewidth, a design with an RF modulation waveform providing a small frequency modulation $f_{mod}$ and a large modulation depth $\beta$ will provide the greatest resistance to nonlinear spectral broadening.

Figure 1:
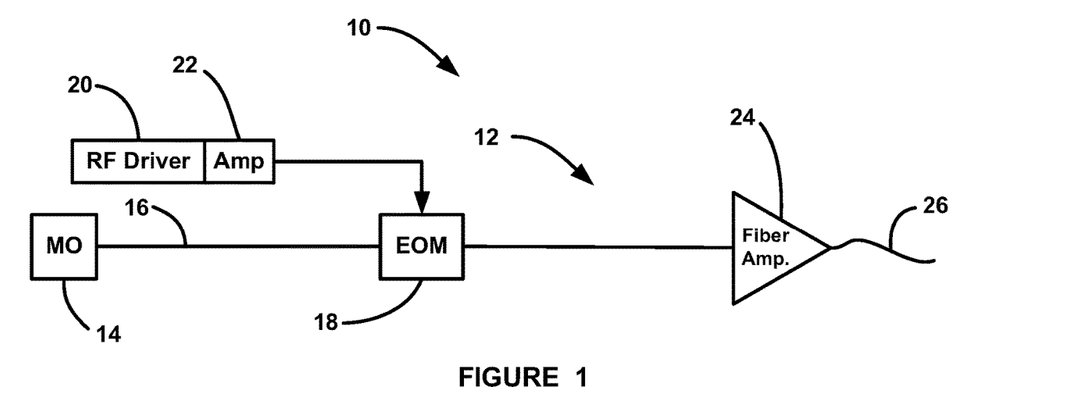
FIG. 1 is a schematic block diagram of a fiber laser amplifier system that employs a method for reducing nonlinear frequency shifts and suppressing SBS using slow-speed, large modulation depth RF waveforms that modulate a seed beam for providing increased beam linewidth.

FIG. 1 is a simplified block diagram of a fiber laser amplifier system 10 that provides FM linewidth broadening in a manner that reduces nonlinear frequency shifts driven by FM-to-AM conversion and provides SBS suppression, as discussed above. The system 10 includes a single amplification channel 12 having a master oscillator (MO) 14 that generates a seed beam on a fiber 16 at a certain wavelength. The seed beam is provided to an RF electro-optical modulator (EOM) 18 that receives an RF waveform from an RF source 20 to frequency modulate the seed beam for providing spectral broadening, where the RF source 20 includes an amplifier 22 for amplifying the RF waveform. However, instead of providing a high-speed, low amplitude RF signal as was done in the known fiber amplifier systems, such as white noise or a pseudo-random bit sequence (PRBS), the RF source 20 provides a low-speed, such as 100 MHz, large modulation depth, such as 100 radians, RF waveform to accomplish the desired optical linewidth broadening, such as 100 radians×100 MHz=10 GHz, of the seed beam. In another embodiment, the RF waveform can be, for example, a piecewise parabolic RF waveform that causes the instantaneous laser frequency to exhibit a periodic chirp, which generates an FM optical spectrum that has less power in the spectral wings for a given optical linewidth. It is noted that the EOM 18 can be at any suitable location in the system 10 before the seed beam is amplified.

The spectrally broadened seed beam is then sent to a non-linear fiber amplifier 24, which may be a plurality of fiber amplification stages each including a pump beam source and a length of doped fiber, such as a ytterbium (Yb) doped length of fiber having a 10-20 μm core, to amplify the seed beam and provide an amplified beam. The plurality of fiber amplification stages may each contain serial components (not shown), such as optical isolators, tap couplers, pump-signal combiners, fiber pigtails, optical filters, etc. These components along with the doped fiber stages impose FM-to-AM conversion on the spectrally broadened seed beam. The RF waveform has a large modulation depth $\beta$ nd the amplifier 24 has a large nonlinear phase shift B≫1, where the system 10 is configured so that $\beta \gg B$ to prevent SPM-driven spectral broadening. An amplified beam is provided on output fiber 26.

Figure 2:
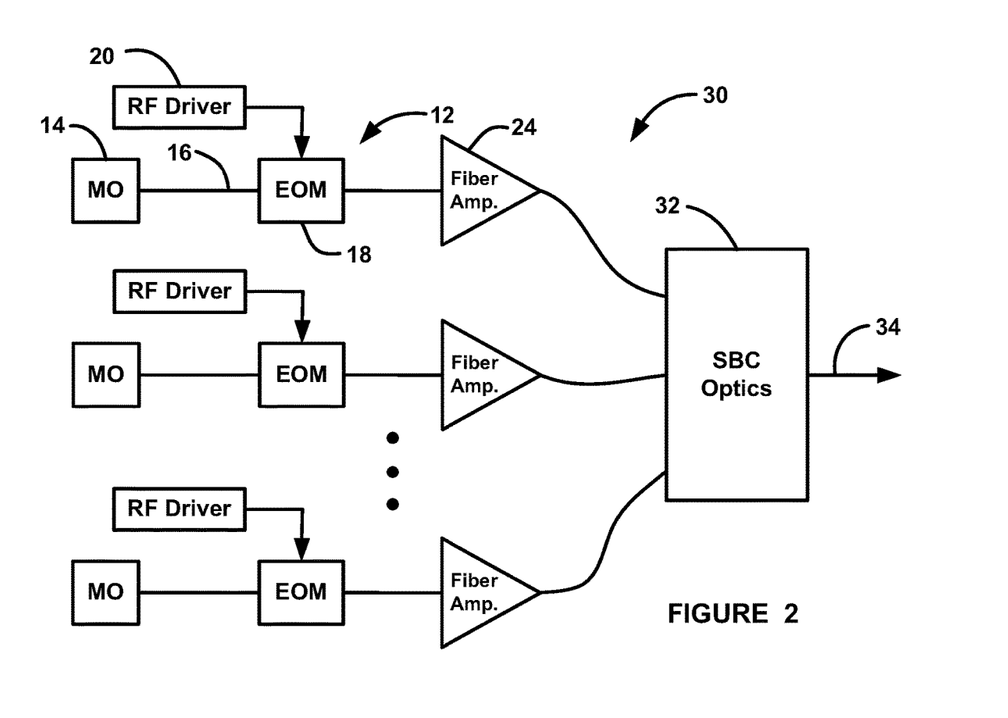
FIG. 2 is a schematic block diagram of an SBC fiber laser amplifier system that employs a method for reducing nonlinear frequency shifts and suppressing SBS using slow-speed, large modulation depth RF waveforms that modulate a seed beam for providing increased beam linewidth.

FIG. 2 is a simplified block diagram of an SBC fiber laser amplifier system 30 that provides FM linewidth broadening in a manner that reduces nonlinear frequency shifts driven by FM-to-AM conversion and provides SBS suppression, as discussed above, where like elements to the system 10 are identified by the same reference number. The system 30 includes a plurality of the system channels 12 each having an MO 14 that generates a seed beam on the fiber 16, but where the MOs 14 in the different channels 12 generate the seed beams at different wavelengths. The amplified beam from each of the amplifiers 24 in the channels 12 are sent to SBC combining optics 32 including a grating (not shown) that has a periodic structure formed into the grating so that when the individual amplified beams each having a slightly different wavelength and angular direction are redirected by the periodic structure so that all of the beams diffract from the diffraction grating in the same direction as a combined output beam 34.

The above analysis is valid for polarized seed beams. For depolarized beams generated using known FM combined with depolarizers that induce birefringent time delays on the order of or greater than the coherence time $1/\Delta v$, the AM frequencies created by subsequent polarization mixing (FM-to-AM mixing) are similar to the optical linewidth, so that nonlinear frequency shifts due to SPM are given by:

$$\delta v_{SPM} = B \Delta v,$$

and the fractional spectral broadening is given by:

$$\delta v_{SPM}/\Delta v = B.$$

Hence, spectral broadening of depolarized beams is not expected to depend on the RF waveform, only on the optical linewidth. Reducing the birefringent delay to values less than the laser coherence time reduces the AM dynamics, and thus reduces the spectral broadening, but at the cost of increasing the degree of polarization (DOP) of the laser beam measured over time scales of ~10s of ns relevant to SBS dynamics, which increases the SBS gain and requires broader linewidths to suppress SBS. The reason that the DOP increases is because with a low modulation depth RF waveform, and with a birefringent delay less than the optical coherence time, there are significant windows of time over which the birefringent phase changes by less than $\pi$, leading to residual polarization.

If a slow-speed RF waveform with high modulation depth is used in place of a high speed, low modulation depth waveform, then the birefringent delay can be reduced to values much less than the laser coherence time without increasing the DOP on the 10s of ns timescales relevant to SBS. This is because even with a small birefringent delay due to the large modulation depth, the polarization Stokes vector traces out a complete rotation on the Poincaire sphere, i.e., a full $2\pi$ birefringent phase shift, multiple times over the ~10s of ns time windows relevant to SBS.

It is noted that a triangle frequency chirp waveform exhibits periodic changes in the sign of the chirp, which will correspond to periodic slowdowns followed by reversals in the direction of the state of polarization (SOP) dynamics. These SOP slowdowns and reversals occupy a window of two times the birefringent delay, so as long as this delay is short compared with the SBS coherence time of ~10s of ns they should not impact SBS suppression. This condition is readily satisfied for chirp rates of practical interest for SBS suppression, typically in the range of ~20-100 MHz.

Figure 3:
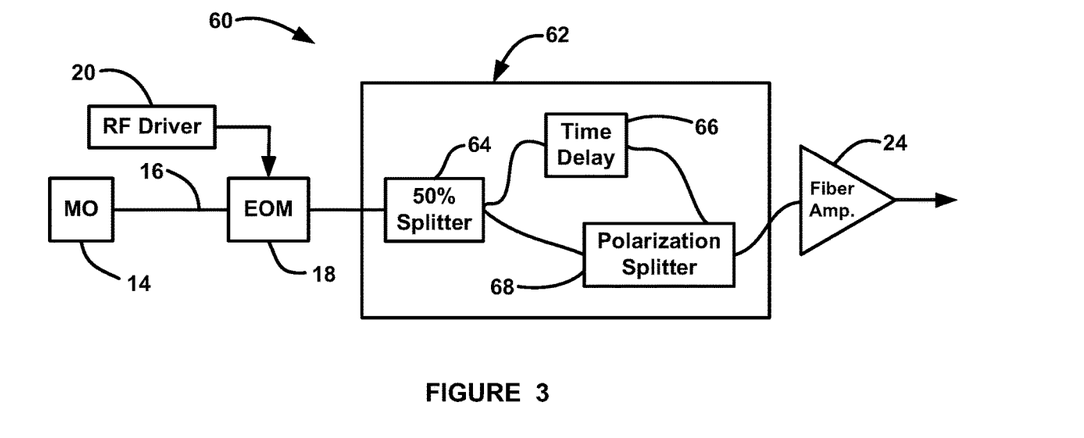
FIG. 3 is a schematic block diagram of a fiber laser amplifier system that employs a method for reducing nonlinear frequency shifts and suppressing SBS using slow-speed, large modulation depth RF waveforms that modulate a seed beam for providing increased beam linewidth and providing depolarization of the seed beam using a split beam time-delay.

FIG. 3 is a schematic block diagram of a fiber laser amplifier system 60, such as one channel of an SBC fiber laser amplifier system, that employs a method for reducing nonlinear frequency shifts driven by FM-to-AM conversion using slow-speed RF waveforms as discussed above, and for providing depolarization of the seed beam using a depolarization assembly 62 before the seed beam is amplified, where like elements to the system 10 are identified by the same reference number. The broadened and polarized seed beam from the EOM 18 is sent to the depolarizing assembly 62, where the beam is split by a 50% beam splitter 64 and one split beam is sent to a time delay device 66, i.e., a length of fiber, to provide a birefringent time delayed beam, where the value of the time delay can be much less than the laser coherence time (~1/optical linewidth) without increasing the DOP over time-scales relevant to SBS suppression because of the low frequency, high modulation depth RF modulation waveform. The delayed split beam and the other split beam from the splitter 64 are combined by a polarization beam splitter 68 in the assembly 62 so that the output state of polarization (SOP) of the combined beam exhibits temporal dynamics much less than the optical linewidth, but sufficiently high speed so that on time scales relevant to SBS the beam appears completely depolarized, where the time delayed beam would be oriented along one polarization axis and the other beam would be oriented along an orthogonal axis.

The SOP temporal dynamics can be selected to any value in the range DC (~zero frequency) up to the full optical linewidth by selecting the value of the birefringent delay in the range from zero up to the laser coherence time. The birefringent delay is selected so that it is much less than the laser coherence time, but large enough that the SOP dynamics are high speed compared to the time scales relevant to SBS (~10s of ns). The AM frequencies created by subsequent polarization mixing (FM-to-AM conversion) in the fiber amplifier 24 will follow the SOP dynamics. Consequently, if the birefringent time delay is set to a value much less than the laser coherence time, the resulting AM dynamics will be much less than the optical linewidth, and the nonlinear frequency shifts due to SPM will also be a small fraction of the optical linewidth. Hence, nonlinear spectral broadening will be reduced in comparison to a system in which the birefringent time delay is set to a value similar to the laser coherence time.

Figure 4:
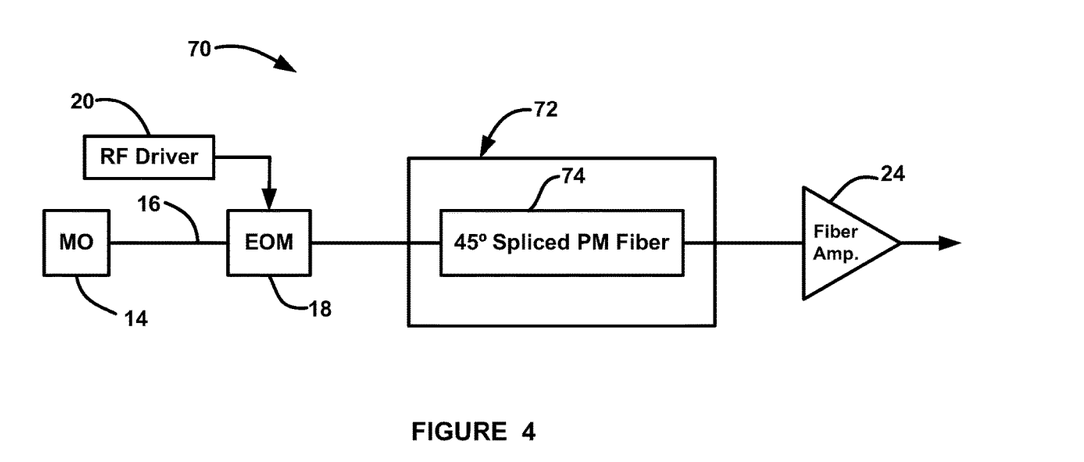
FIG. 4 is a schematic block diagram of a fiber laser amplifier system that employs a method for reducing nonlinear frequency shifts and suppressing SBS using slow-speed, large modulation depth RF waveforms that modulate a seed beam for providing increased beam linewidth and providing depolarization of the seed beam using a 45° spliced polarization maintaining fiber.

FIG. 4 is a schematic block diagram of a fiber laser amplifier system 70, such as one channel of an SBC fiber laser amplifier system, that employs a method for reducing nonlinear frequency shifts driven by FM-to-AM conversion and providing SBS suppression as discussed above, and providing depolarization of the seed beam using a depolarization assembly 72 before the seed beam is amplified, where like elements to the system 10 are identified by the same reference number. In this embodiment, the depolarization assembly 72 includes a birefringent polarization maintaining (PM) fiber 74 that is spliced at 45° relative to an input PM fiber so that equal powers are launched on each of the slow axis and the fast axis of the fiber 74. The birefringent time delay is determined by the length of the PM fiber 74 multiplied by its birefringence and is typically selected to be much less than the laser optical coherence time for the same reasons as discussed above.

The underlying physics of the nonlinear SPM impairment is identical for CBC and SBC, but the system impact is different. For CBC, the issue is not nonlinear spectral broadening per se, but rather nonlinear phase fluctuations that are faster than the ability of the system to correct phase changes that reduce the time-averaged coherence, and thus limit the CBC combining efficiency, which is known to scale as $1-\Delta\Phi^2$, where $\Delta\Phi$ is the RMS phase fluctuation in radians. For example, if RMS nonlinear phase errors are 0.1 rad, then the CBC efficiency will drop by 1%.

Using a slow-speed RF waveform does not directly impact the magnitude of the phase fluctuations $\Delta\Phi$ or the loss of coherence over timescales relevant for active servo-based phase locking (typically ~10s of kHz), where the amplified beam will exhibit similar RMS phase noise $\Delta\phi$ due to SPM regardless of the RF signal speed. However, a slow-speed RF waveform does enable the prospect of direct time-domain compensation of SPM, so as to recover coherence and CBC efficiency. This is because the associated AM and SPM dynamics are slow and periodic, which makes active detection and feedback based control using relatively low speed detection and low speed controllers feasible.

These sub-GHz class dynamics are well within the capability of modern EOM phase actuators and drive electronics to match. Since the SPM dynamics exhibit the same periodicity as the RF drive waveform, and are otherwise essentially stationary, they can be detected and averaged over multiple cycles, and feedback control to compensate can be similarly low speed, with control bandwidths driven by the speed of external changes to the fiber parameters, for example, drifts in power or in polarization, which are typically Hz-class rather than by the SPM dynamics themselves.

Figure 5:
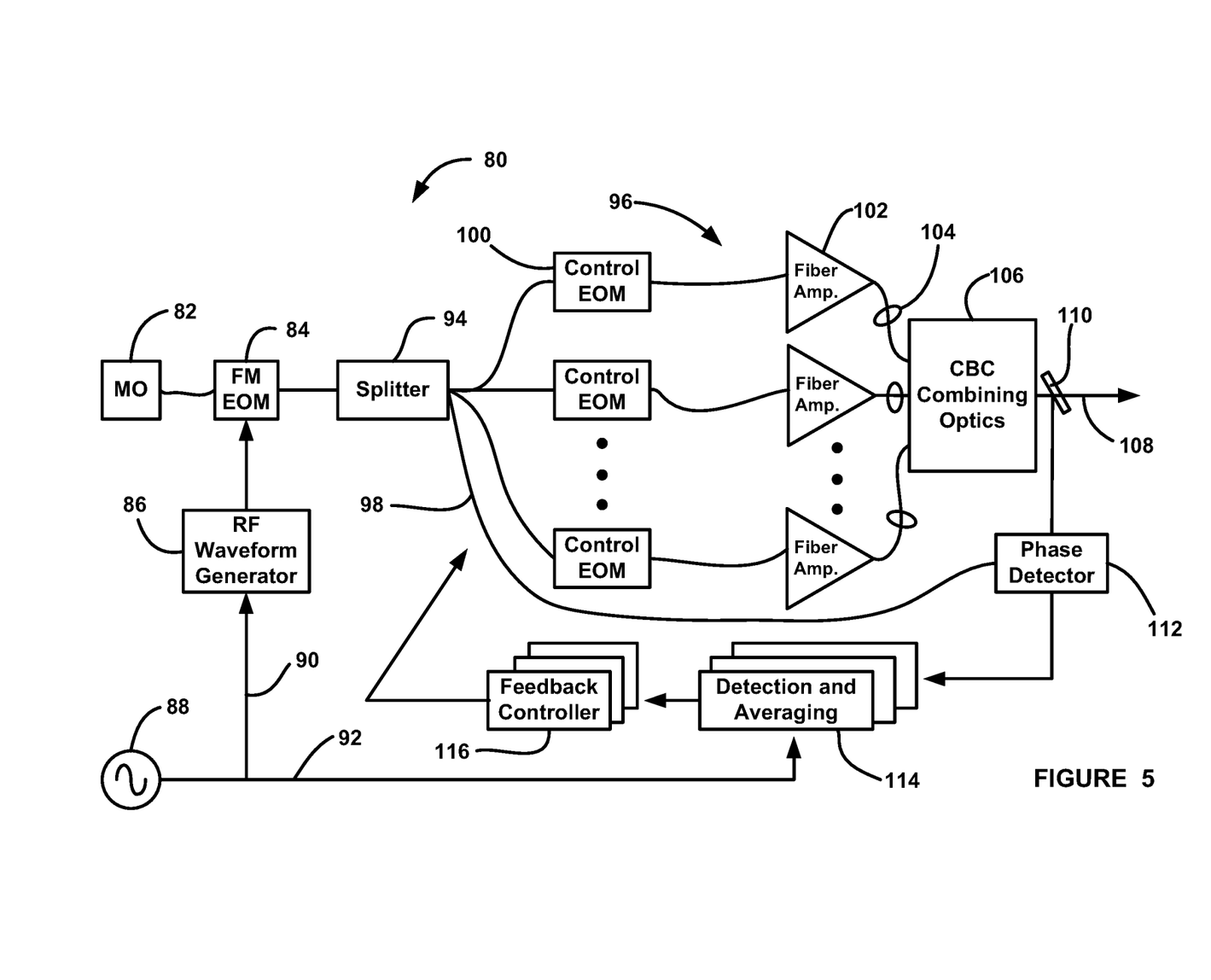
FIG. 5 is a schematic block diagram of a CBC fiber laser amplifier system that reduces decoherence arising from nonlinear frequency shifts driven by FM-to-AM conversion using active phase control.

FIG. 5 is a schematic block diagram of a CBC fiber amplifier system 80 in which SPM is directly sensed and compensated in the time domain. The system 80 includes an MO 82 that generates a seed beam that is sent to an FM EOM 84. The EOM 84 receives a slow-speed RF waveform from a waveform generator 86 controlled by a slow clock signal provided by a clock 88 on a seed beam path 90, for example, a few tens of MHz, that provides the periodicity for repeating the RF waveform used to broaden the seed beam linewidth, where the clock signal is also provided on a reference path 92. The waveform generator 86 can include a high voltage RF amplifier to provide a high modulation depth RF waveform. The modulated seed beam is split by a splitter 94 and split seed beams are sent to a plurality of CBC channels 96 and a reference path 98. The split modulated seed beam is sent to a control EOM 100 in each channel 96, which may also serve as a piston phase servo-actuator in the system 80, and is then amplified to high power in a spectrally distorting, i.e., an FM-to-AM conversion-inducing, nonlinear fiber amplifier 102. The amplified beam in each channel 96 is collimated by collimating optics 104 and then combined with the other amplified beams in CBC combining optics 106 as an output laser beam 108. As discussed above, the CBC combining optics 106 includes a DOE, or other suitable optics, that combines the coherent amplified beams, where the DOE has a periodic structure formed into the element so that when the individual beams each having a slightly different angular direction are redirected by the periodic structure all of the beams diffract from the DOE in the same direction. A sample of the combined output beam 108 is provided by a beam sampler 110 to a phase detector 112 along with the reference beam on the path 98. A phase error signal between the reference beam and the sample beam in each channel 96 that detects phase fluctuations is provided to a separate synchronous detection and averaging device 114 to average the phase error fluctuations over the time period defined by the clock signal on the path 92, where the clock 88 operates as a local oscillator for an RF mixer, and the averaged error signal is provided to a separate feedback controller 116 for each channel that controls the EOMs 100 for providing phase control.

A number of variations of the system 80 are possible, in particular ones associated with different electronic methods of phase-locking and coherence measurements in the context of a CBC array of fiber channels. In particular, it may be possible to avoid the use of any RF-class detection (reducing bandwidth requirements from sub-GHz class to ~10× the disturbance frequency, which could be Hz-class) by using metrics associated solely with time-averaged coherence to identify SPM and correct in a simplified control scheme. In addition, it might be possible to use amplitude rather than phase detection and/or actuation to sense and correct the SPM dynamics, i.e., sense the synchoronous output power fluctuations and apply corresponding inverted phase or AM on the seed input.

It is noted that single-tone modulation may be an ideal RF drive waveform for CBC fiber amplifier applications. By using a single tone RF, the sharp turnarounds exhibited by a triangular frequency chirp are eliminated, which also eliminates the abrupt change in slope of the SPM. The SPM dynamics for single-tone RF are confined to the fundamental and second harmonic of the RF frequency, thus relaxing the detection and actuation bandwidth requirements. For example, with a 33 MHz RF frequency the detection and actuation bandwidths could be less than 100 MHz. The number of control parameters is greatly reduced. Simply adjusting the RF phases and amplitudes of the first one or two harmonics of the slow RF may suffice to provide a flattened phase profile in time.

Further, all-electronic path matching appears feasible using the above described slow RF approach. By using a slow-speed RF signal, the uncontrolled variations between channels can be sensed and actively compensated. Applying an RF time delay would then ensure the lasers are coherence-path matched at the output.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for reducing nonlinear frequency shifts and suppressing stimulated Brillouin scattering (SBS) in a fiber laser amplifier system, said method comprising:
providing at least one seed beam having a certain wavelength;
frequency modulating the at least one seed beam with an RF waveform to spectrally broaden the seed beam, said RF waveform being a relatively slow-speed waveform of less than 300 MHz having a large modulation depth of greater than 100 radians; and
amplifying the modulated seed beam with an amplifier having a large nonlinear phase shift of greater than 10 radians and exhibiting frequency modulation (FM) to amplitude modulation (AM) conversion, wherein the modulation depth is much larger than the nonlinear phase shift.

2. The method according to claim 1 wherein frequency modulating the at least one seed beam with an RF waveform includes frequency modulating the at least one seed beam with a piecewise parabolic RF waveform.

3. The method according to claim 1 wherein frequency modulating the at least one seed beam with an RF waveform includes frequency modulating the at least one seed beam with a single tone RF waveform.

4. The method according to claim 3 wherein the frequency of the single tone RF waveform is 100 MHz.

5. The method according to claim 1 further comprising splitting the frequency modulated seed beam into a plurality of split frequency modulated seed beams, controlling the phase of each split seed beam with a phase controller and amplifying the frequency modulated split seed beams by a plurality of amplifiers each having a large nonlinear phase shift and exhibiting FM-to-AM conversion, said method further comprising providing the amplified beams to coherent beam combining optics that combines the amplified seed beams.

6. The method according to claim 5 further comprising synchronizing the RF waveform by a clock signal, synchronously detecting phase errors of the split seed beams using the clock signal and applying the detected phase errors to the phase controllers so as to lock the amplified beams in phase with each other.

7. The method according to claim 1 wherein the at least one seed beam is a plurality of seed beams having different wavelengths, each seed beam being frequency modulated by an RF waveform having a relatively slow-speed waveform and a large modulation depth and amplifying the modulated seed beams by a plurality of amplifiers each having a large nonlinear phase shift and exhibiting FM-to-AM conversion, said method further comprising providing the amplified beams to spectral beam combining optics that spectrally combines the amplified seed beams.

8. The method according to claim 1 further comprising depolarizing the at least one seed beam before it is amplified.

9. The method according to claim 8 wherein depolarizing the seed beam includes splitting the seed beam into two seed beams, delaying one of the split seed beams and combining the delayed split seed beam and the other split seed beam, where the delay is set to a value much less than the optical coherence time of the frequency modulated seed beam.

10. The method according to claim 8 wherein depolarizing the seed beam includes providing the seed beam to a birefringent polarization maintaining (PM) fiber that is spliced at 45° relative to an input PM fiber so that equal powers are launched on each of a slow axis and a fast axis of the PM fiber to induce a birefringent delay, and where the birefringent delay is set to a value much less than the optical coherence time of the modulated seed beam by selecting the length and birefringence of the PM fiber.

11. A method for reducing nonlinear frequency shifts and suppressing stimulated Brillouin scattering (SBS) in a fiber laser amplifier system, said method comprising:
providing at least one seed beam having a certain wavelength;
frequency modulating the at least one seed beam with an RF waveform to spectrally broaden the seed beam, said RF waveform being a relatively slow-speed waveform of less than 300 MHz having a large modulation depth of greater than 100 radians; and
amplifying the frequency modulated seed beam with an amplifier having a large nonlinear phase shift of greater than 10 radians.

12. The method according to claim 11 wherein frequency modulating the at least one seed beam with an RF waveform includes frequency modulating the at least one seed beam with a piecewise parabolic RF waveform.

13. The method according to claim 11 further comprising splitting the frequency modulated seed beam into a plurality of split frequency modulated seed beams, controlling the phase of each split seed beam with a phase controller and amplifying the frequency modulated seed beams by a plurality of amplifiers each having a large nonlinear phase shift and exhibiting frequency modulation (FM) to amplitude modulation (AM) conversion, said method further comprising providing the amplified beams to coherent beam combining optics that combines the amplified seed beams.

14. The method according to claim 11 wherein the at least one seed beam is a plurality of seed beams having different wavelengths, each seed beam being modulated by an RF waveform having a relatively slow-speed waveform and a large modulation depth and amplifying the frequency modulated seed beams by a plurality of amplifiers each having a large nonlinear phase shift and exhibiting frequency modulation (FM) to amplitude modulation (AM) conversion, said method further comprising providing the amplified beams to spectral beam combining optics that spectrally combines the amplified seed beams.

15. The method according to claim 11 further comprising depolarizing the at least one seed beam before it is amplified.

16. A system for reducing nonlinear frequency shifts and suppressing stimulated Brillouin scattering (SBS) in a fiber laser amplifier system, said system comprising:

means for providing at least one seed beam having a certain wavelength;

means for frequency modulating the at least one seed beam with an RF waveform to spectrally broaden the seed beam, said RF waveform being a relatively slow-speed waveform of less than 300 MHz and having a large modulation depth of greater than 100 radians; and     means for amplifying the frequency modulated at least one seed beam where the means for amplifying has a large nonlinear phase shift of greater than 10 radians and exhibiting frequency modulation (FM) to amplitude modulation (AM) conversion, wherein the modulation depth is much larger than the nonlinear phase shift.

17. The system according to claim 16 further comprising means for splitting the frequency modulated seed beam into a plurality of split modulated seed beams and means for controlling the phase of the split seed beams, said means for amplifying the frequency modulated seed beam amplifying all of the split seed beams, said system further comprising coherent beam combining means for combining the amplified seed beams.

18. The system according to claim 17 further comprising means for synchronizing the RF waveform with a clock signal and synchronously detecting the phase errors of the split seed beams using the clock signal and applying the detected phase errors to the means for controlling the phase so as to lock the amplified beams in phase with each other.

19. The system according to claim 16 wherein the means for providing at least one seed beam provides a plurality of seed beams having different wavelengths, said means for frequency modulating the at least one seed beam frequency modulates each seed beam and said means for amplifying the modulated seed beam amplifies all of the seed beams, said system further comprising spectral beam combining means for combining the amplified seed beams.

20. The system according to claim 16 further comprising means for depolarizing the at least one seed beam before it is amplified.

\* \* \* \* \*